Nov. 28, 1933.                R. T. COBB                1,936,584
                MACHINE FOR MAKING FROZEN CONFECTIONS
                    Filed July 8, 1930        6 Sheets-Sheet 2
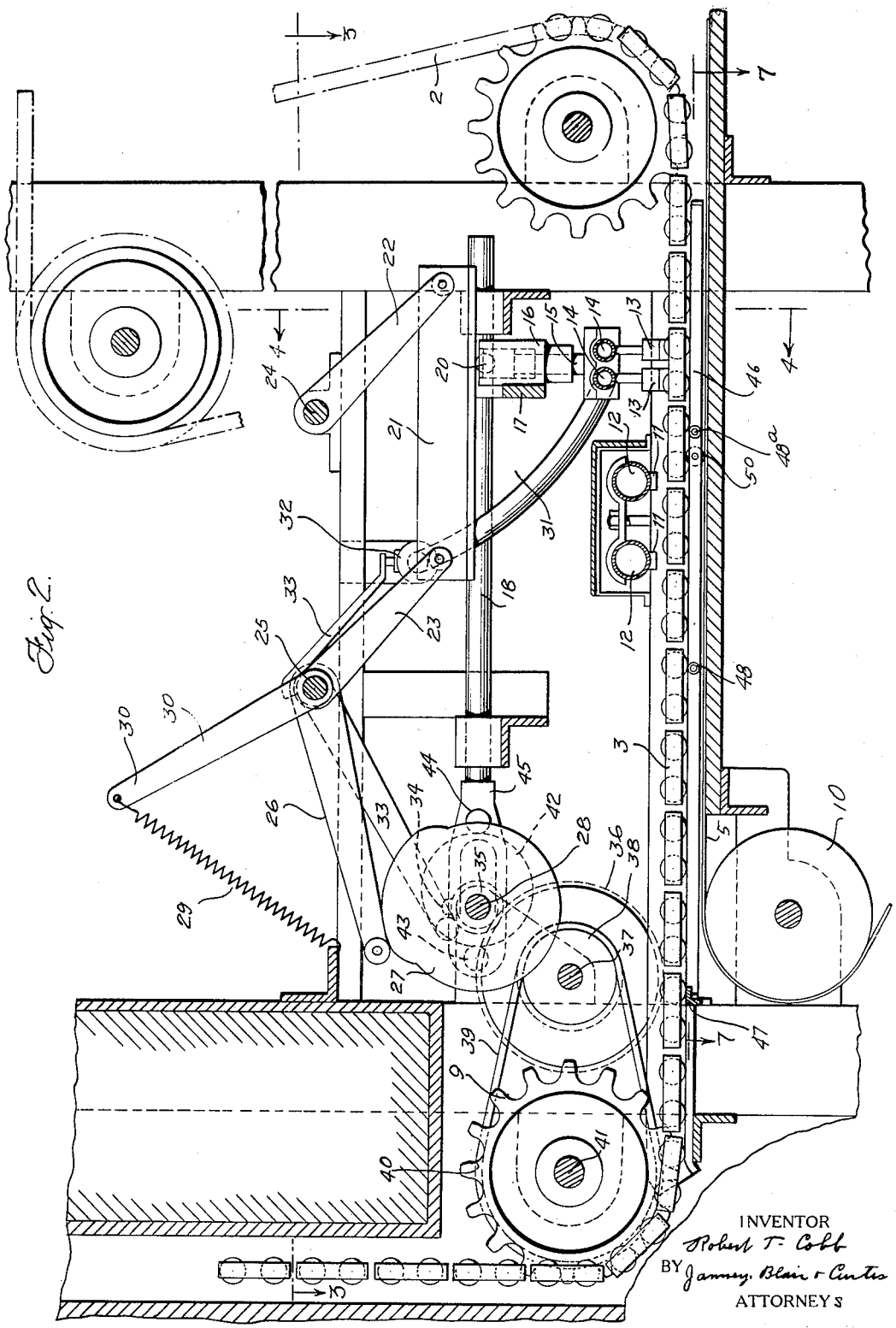

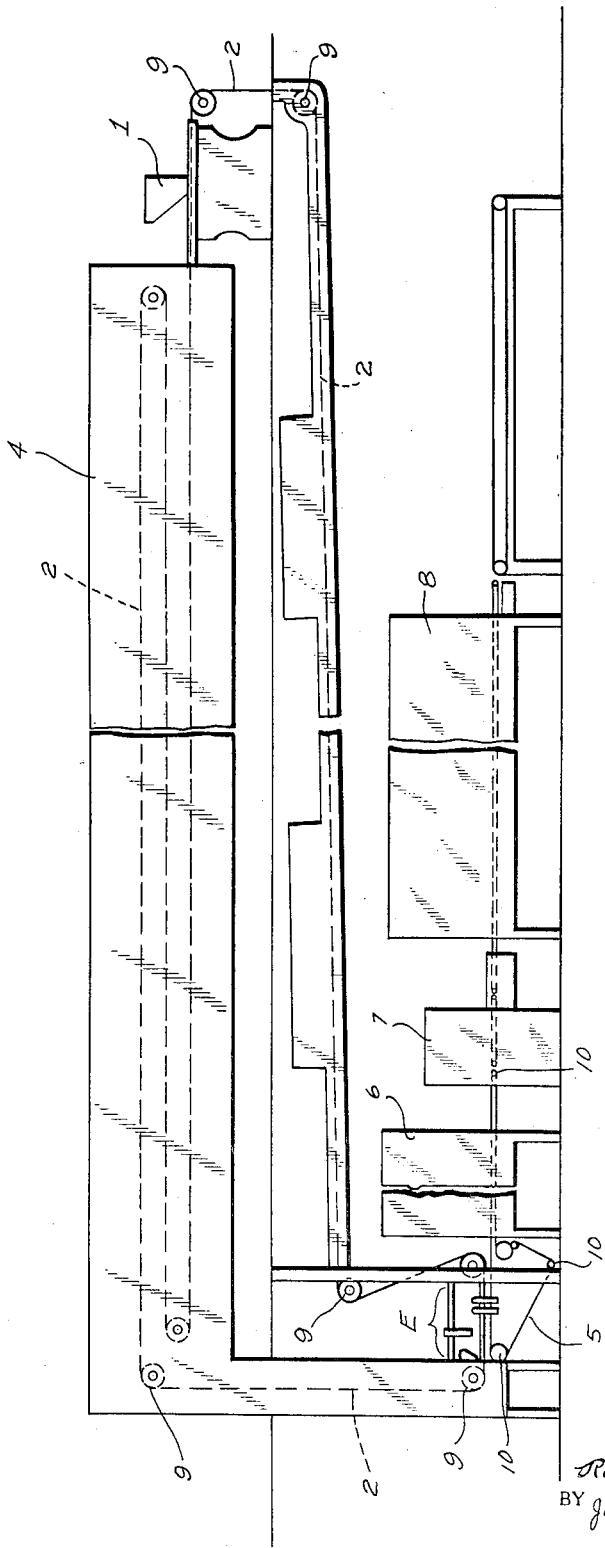

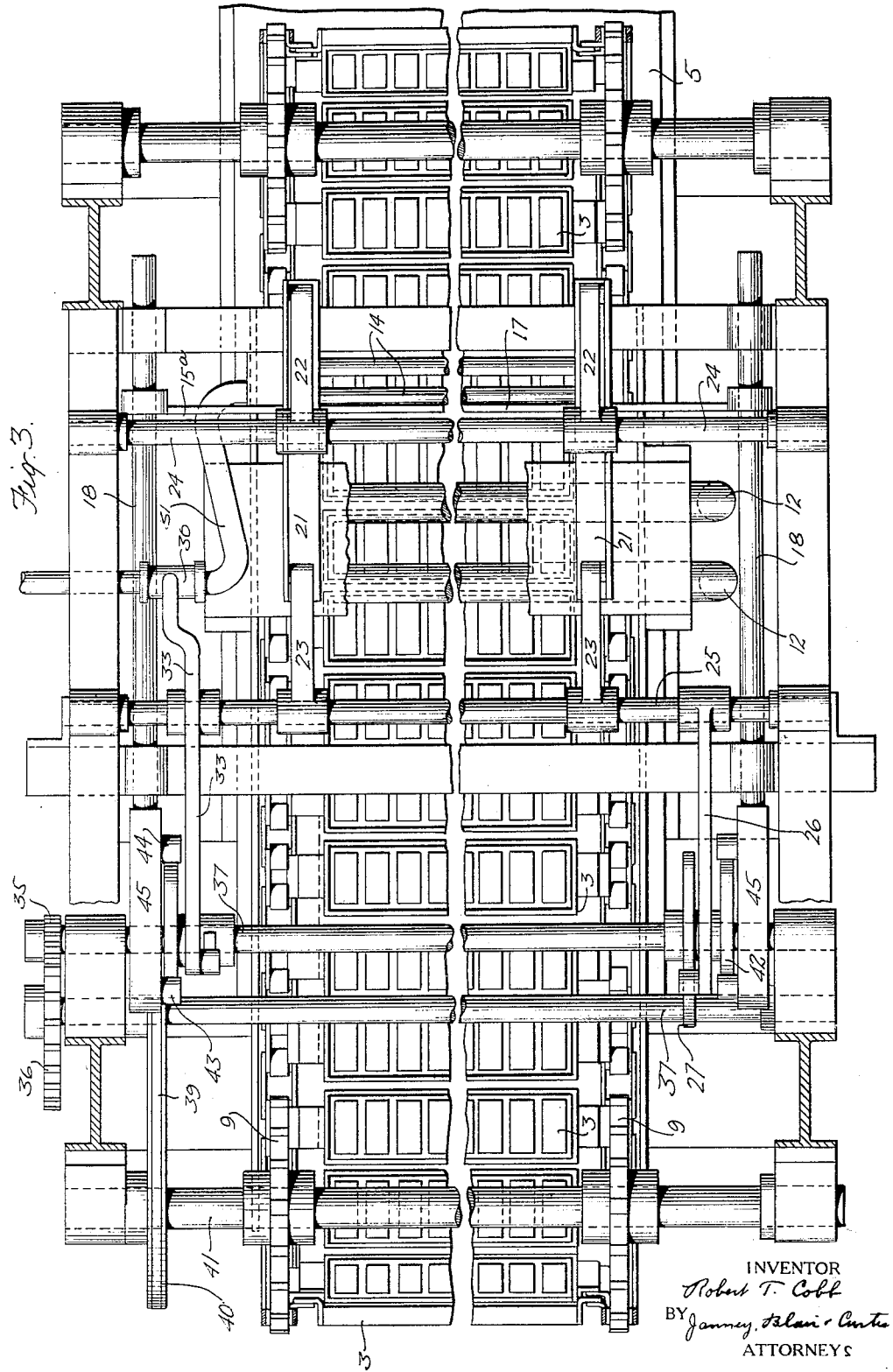

Nov. 28, 1933.    R. T. COBB    1,936,584
MACHINE FOR MAKING FROZEN CONFECTIONS
Filed July 8, 1930    6 Sheets-Sheet 4
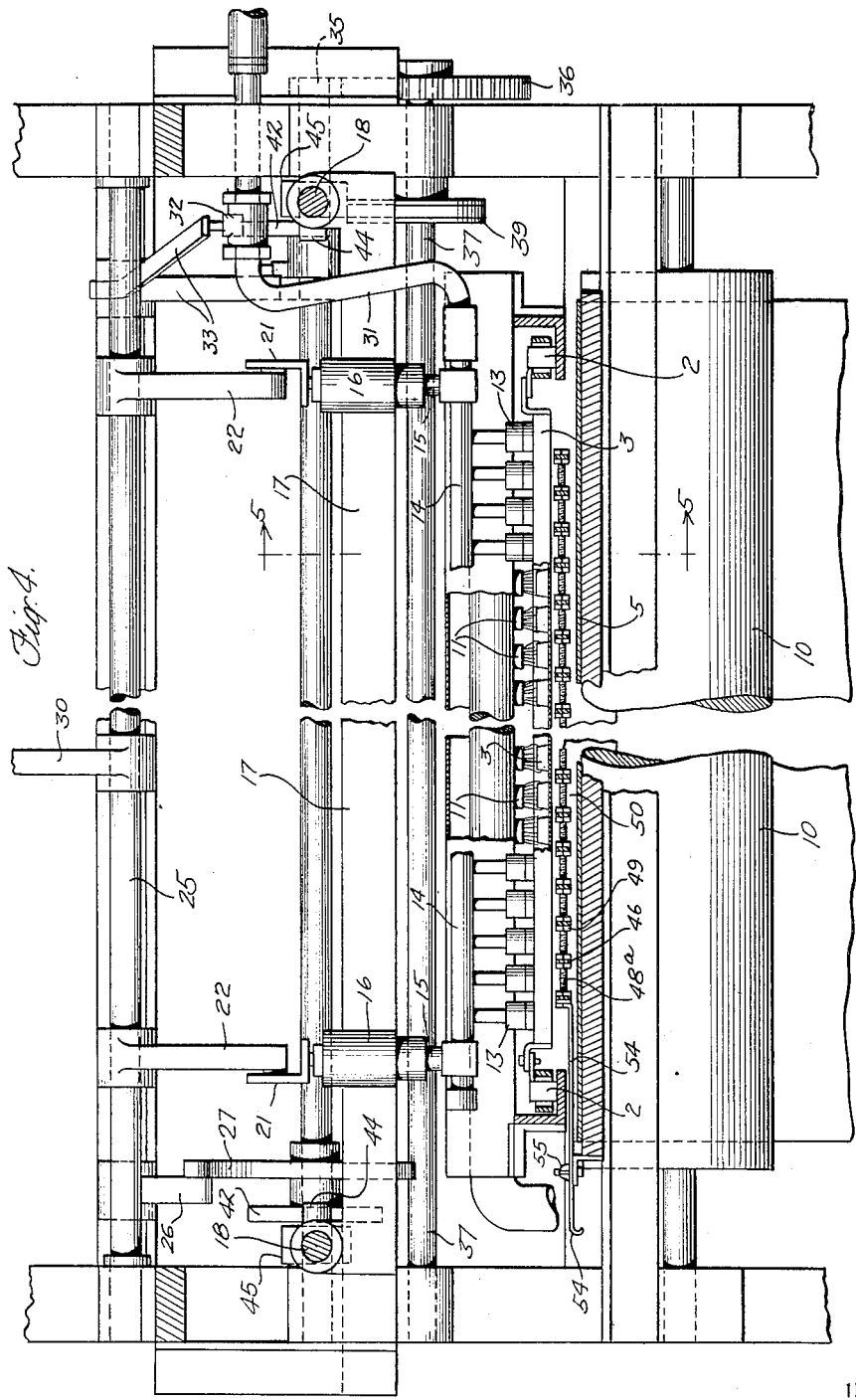
INVENTOR
Robert T. Cobb
BY Janney, Blair + Curtis
ATTORNEYS Nov. 28, 1933.  R. T. COBB  1,936,584
MACHINE FOR MAKING FROZEN CONFECTIONS
Filed July 8, 1930   6 Sheets-Sheet 5
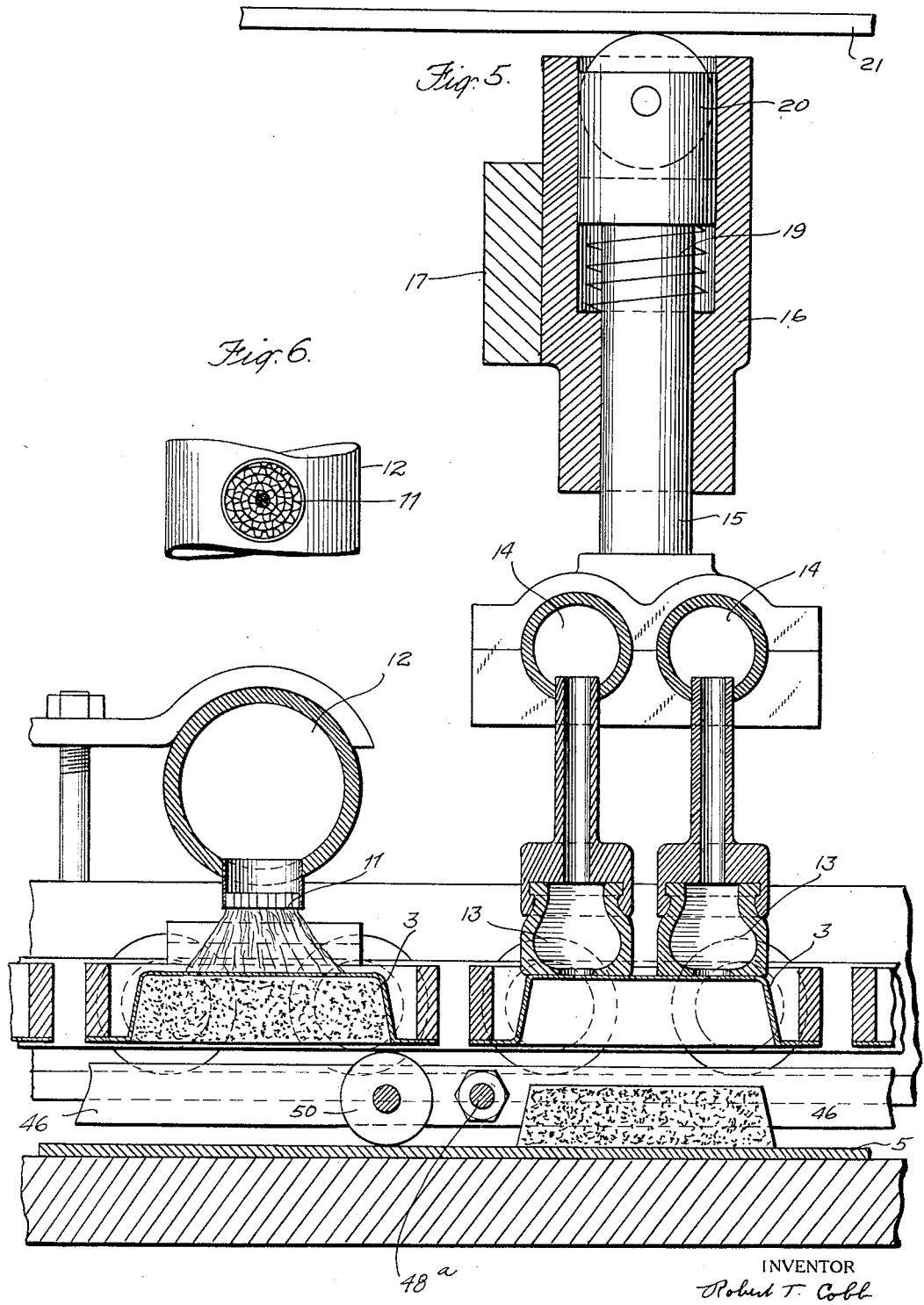

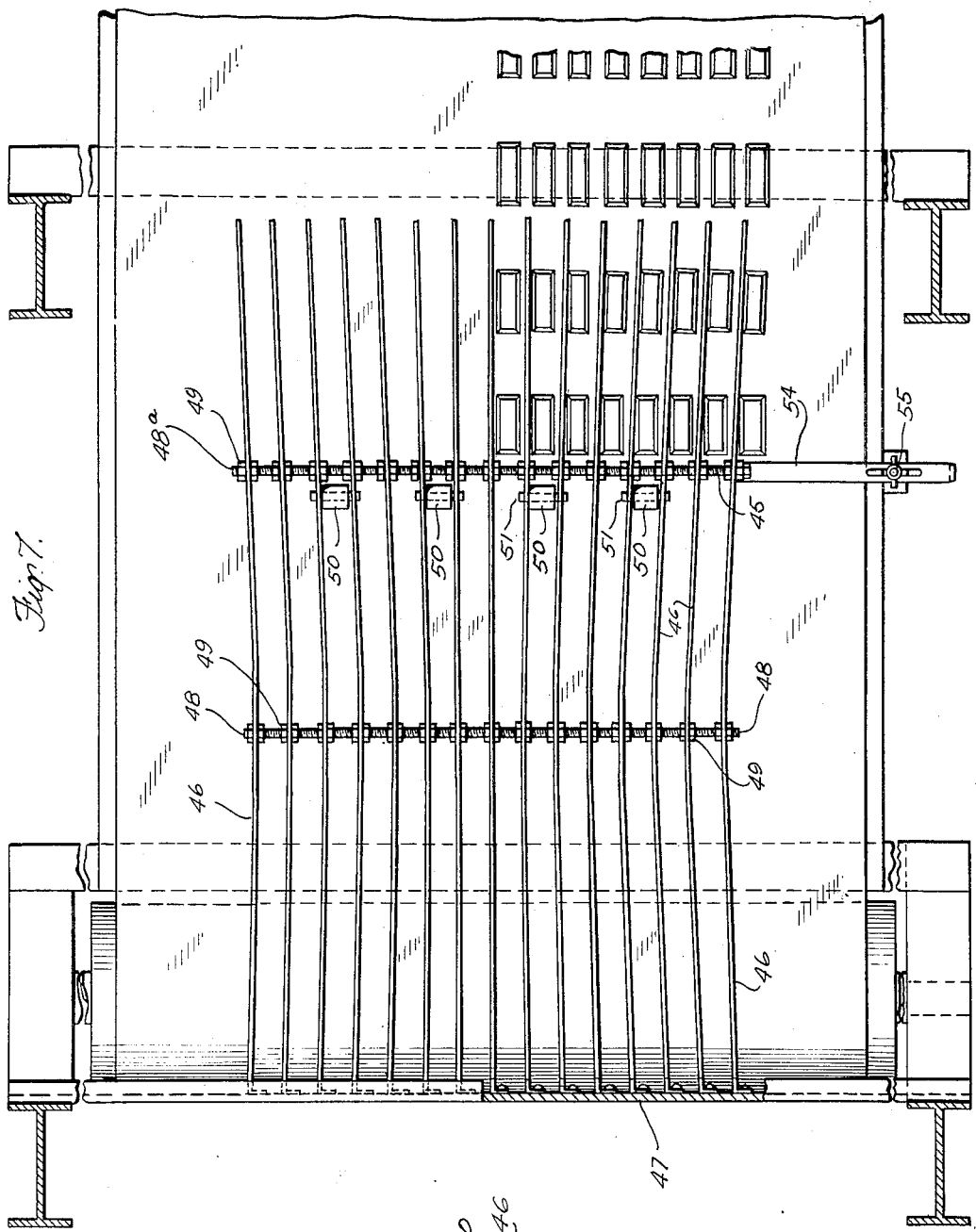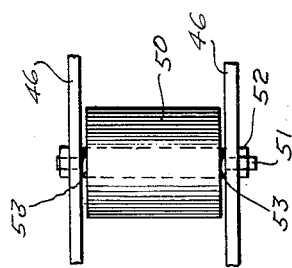

Patented Nov. 28, 1933

1,936,584

UNITED STATES PATENT OFFICE 1,936,584

MACHINE FOR MAKING FROZEN CONFECTIONS

Robert T. Cobb, South Elmhurst, N. Y., assignor to New York Eskimo Pie Corporation, Brooklyn, N. Y., a corporation of New York Application July 8, 1930. Serial No. 466,389

7 Claims. (Cl. 107—8)

This invention relates to apparatus for the production of frozen confections.

In the production of frozen confections such as chocolate coated ice cream cakes or other similar confections it has been the practice to freeze the confection in small molds of the required size and shape for a single cake and eject the cakes on to a conveyor for transportation to the coating machine. Difficulty has been encountered in ejecting the frozen cakes from the molds and in positioning the cakes in spaced relationship on the conveyor.

It is an object of this invention to provide an efficient means for automatically ejecting the frozen confections from the molds in which such confections are frozen on to a belt conveyor for transportation to a coating mechanism.

Another object is to provide means for positioning the frozen confections in spaced relationship on the belt conveyor.

Other objects will be in part obvious and in part pointed out hereinafter.

Accordingly the invention consists in the features of construction, combinations of elements, and arrangements of parts which will be exemplified in the structure hereinafter described and the scope of the application of which will be indicated in the sub-joined claims.

In the drawings:—

Figure 1 is a diagrammatic view of apparatus embodying the invention for making frozen confections.

Fig. 2 is an enlarged side elevation partly in section of the confection ejecting mechanism.

Fig. 3 is a sectional view taken on the line 3—3 of Fig. 2.

Fig. 4 is a sectional view taken on the line 4—4 of Fig. 2.

Fig. 5 is an enlarged sectional view taken on the line 5—5 of Fig. 4, and showing the flame heater and air blowers for ejecting the frozen cream from the molds.

Fig. 6 is a detailed view of the flame spraying nozzle.

Fig. 7 is a plan view of the confection separator.

Fig. 8 is an enlarged plan view of one of the rollers for supporting the separator on the belt conveyor.

In Fig. 1 is shown diagrammatically a complete machine for freezing and coating ice cream cakes. Referring to the upper right hand corner of the machine a hopper 1 is provided to receive the cream to be frozen and coated. Passing beneath hopper 1 is an endless conveyor 2 which carries individual molds 3 (see Fig. 2) to receive cream dropped from hopper 1. Conveyor 2 which passes over sprocket wheels 9, carries the cream first through a cooling chamber 4 where the cream is frozen hard in the molds 3, and thence to the ejecting and separating mechanism indicated generally at E in Fig. 1. The ejecting mechanism removes the frozen cakes from the molds 3 and deposits them on to an endless belt 5 which passes over rollers 10 and carries the cakes through a second cooling chamber 6 and to other belts which convey the cakes through a chocolate enrobing compartment 7, another cooling room 8, and to wrapping machines, not shown. Sprocket wheels 9 and rollers 10 are driven from any suitable source of power.

Referring to Fig. 2, as the conveyor 2 and molds 3 leave the hardening room 4 they pass around a sprocket wheel 9 and then horizontally beneath the ejecting means presently to be described. Passage of the molds around sprocket wheel 9 inverts the molds so that the frozen cakes may be ejected downwardly on the belt conveyor 5 located directly beneath conveyor 2. Even when inverted the frozen cakes adhere firmly to the sides of the molds 3. For loosening the cakes in the molds a heater is positioned in close proximity to the inverted molds to apply heat thereto as they pass beneath the heater. As best shown in Figs. 2, 4 and 5, the heater consists of a plurality of flame-emitting burners 11, preferably gas burners, which spray the flames directly on the bottoms and sides of the molds 3 as they pass beneath the burners. The flame heat thus applied melts the outer surfaces of the frozen confection sufficiently to loosen it in the mold. Gas for the burners 11 may be supplied through pipes 12.

Continued movement of the conveyor 2 past the burners 11 brings the inverted molds beneath compressed air blowers 13 which blow air through small holes provided in the bottom of the molds and eject the cakes downwardly on to the belt 5. Compressed air for the blowers 13 may be supplied through pipes 14. Blowers 13 are given a four-motion movement to engage and travel with each mold as it reaches the plane of the blowers.

As best shown in Figs. 4 and 5, blowers 13 are connected to the pipes 14 which are supported on either side of the machine by a plunger 15 vertically reciprocable in a housing 16 which is carried by a cross bar 17 secured at either side of the machine to shafts 18 reciprocable horizontally in bearings secured to the frame work of the machine. Surrounding each of the plungers 15 is a spring 19 to normally maintain the blowers 13 in raised position above the molds. As shown in Fig. 2, the upper extremity of each plunger 15 is provided with a roller 20 adapted to contact with the under side of a swinging plate 21 pivotally supported at one end by a swinging arm 22 and at the other end by an arm 23 fast on a shaft 25 journaled in the frame work of the machine. Arm 22 is pivoted to a shaft 24 carried by the frame work of the machine. For rocking shaft 25 an arm 26 fast on said shaft contacts with a cam 27 carried by a shaft 28 journaled in the side frames of the machine. Contact between cam 27 and arm 26 is maintained by a spring 29 and an extension arm 30 also fast on shaft 25. The arrangement is such that the raising of arm 26 by cam 27 causes plate 21 to swing downwardly and force blowers 13 down on to the bottoms of molds 3; the nozzles of the blowers being so positioned as to drop over small openings provided in the bottom of each mold. As the blowers engage the molds, compressed air is forced through the blowers from a flexible pipe or hose 31; a valve 32 being provided to control the passage of the air into the pipe 31. Valve 32 is controlled through a bell crank arm 33 pivoted on shaft 25 and operated by a cam 34 on shaft 28. Shaft 28 is rotated through a gear 35 on shaft 28, a gear 36 on a shaft 37, a sprocket 38 on shaft 37, and a sprocket chain 39 connecting sprocket 38 and a sprocket 40 on sprocket shaft 41.

Shafts 18 are reciprocated horizontally to move blowers 13 with the molds and return them for the next operation by means of an eccentric 42 mounted on shaft 28 and contacting with rollers 43 and 44 carried by a fork 45 secured to the shaft 18.

It will thus be seen that the frozen confection in its movement through the machine is first loosened in the molds by the application of a flame heat and then forcibly ejected by a blast of compressed air through the blowers which blow air through the holes in the bottom of each mold as it passes. As the ejected cakes of confection drop on to the surface of belt conveyor 5 their tendency (probably due to the heat applying operation and the force with which they are ejected from the mold) is to fall, or shift, or run into contact with each other. To position the separate cakes on the belt in spaced relationship after they are ejected from the molds a positioning or separating device is provided.

As best shown in Fig. 7, the positioner or separator means comprises a series of spaced guide bars 46 secured at one end to a cross beam 47 and extending in the direction of travel of the belt 5. Bars 46 are held in spaced relationship by threaded cross rods 48 and 48ᵃ and nuts 49 which may be adjusted by turning on the rod. Bars 46 are supported on the belt 5 by rollers 50 rotatably mounted on short shafts 51 supported by bars 46 and held in position by nuts 52 (see Fig. 8). Between the ends of each roller 50 and the bars 46 a shoulder 53 is preferably inserted to prevent the ends of the roller from contacting with the bars 46. The bars 46 provide channels into which the frozen cakes are deposited by the ejecting mechanism and guided into proper spaced relationship on the belt 5. It will be noted that the center bar 46 extends in substantially a straight line from its point of contact with cross beam 47 and that the bars 46 on either side of the center bar extend at an angle which is slightly oblique thereto so that cakes dropped into the channels on the line indicated at X in Fig. 7 are moved by the belt 5 against one of the channel bars 46 before emerging from the channels and are thereby spaced uniform distances apart on the belt 5. The angle of the bars 46 may be adjusted by adjusting nuts 49 on the cross rod 48.

For shifting the separator as a whole to position the channels in alignment with the molds on conveyor 2, there is secured to one end of cross rod 48ᵃ a longitudinally adjustable bar 54 which is adjustably secured to the frame of the machine by a clamp 55.

It will be noted that the separator bars 46 are supported on the moving belt 5 by the rollers 50. This arrangement permits locating the conveyor 2 in close proximity to belt 5 and reduces to a minimum the extent of the drop of the cakes from the molds 3 to the belt 5.

In operation the conveyor 2 with the inverted molds 3 is moved at substantially a uniform speed beneath the burners 11 which loosen the frozen cakes in the molds. The air nozzles 13 then descend and move with the molds while blowing the frozen cakes from the molds onto the belt 5. Separator bars 46 guide the moving cakes into spaced relationship on the belt 5 so that they may be coated on all sides when carried through the chocolate enrobing compartment.

It will be seen that there is provided a construction of an essentially practical nature in which the several objects of the invention are attained.

As many possible embodiments may be made of the invention, and as many changes might be made in the embodiment above set forth, it is to be understood that all matter hereinbefore set forth or shown in the accompanying drawings is to be interpreted as illustrative and not in a limiting sense.

I claim:

1. In a machine for use in making frozen confections, the combination of a conveyor for confection molds, a confection enrober, a belt conveyor for receiving frozen confection cakes ejected from the molds and delivering them to the enrober, means for ejecting the frozen cakes from the molds, and means located beneath the ejector means to receive the ejected cakes and position them in spaced relationship on the belt conveyor; said positioning means comprising a plurality of spaced bars supported on said belt at an angle to the direction of travel of the belt to receive the cakes between them and guide the moving cakes into spaced relationship for delivery to the enrober, and means to adjust the angle of the bars.

2. In a machine for use in making frozen confections, the combination of a conveyor for confection molds, a confection enrober, a belt conveyor for receiving frozen confection cakes ejected from the molds and delivering them to the enrober, means for ejecting the frozen cakes from the molds, and means located beneath the ejector means to receive the ejected cakes and position them in spaced relationship on the belt conveyor; said positioning means comprising a plurality of spaced bars provided with rollers to contact with the belt and support the bars thereon.

3. In a machine for use in making frozen confections in molds, means for ejecting the frozen confection cakes from moving molds comprising, in combination, a flame heater arranged to direct a flame on the bottom of each moving mold to loosen the cake in the mold, and an air pressure blower operable on the moving molds to blow the cake out of the molds.

4. In a machine for handling frozen confections in molds, the combination of a conveyor for the molds, means for ejecting the frozen confection cakes from the moving molds including a flame heater arranged to direct a flame on the bottom of each mold to loosen the cake in the mold, and an air pressure blower to blow the cake out of the mold, said blower having a rectilinear reciprocating movement to permit it to engage and move with each mold during a blowing operation.

5. In a machine for handling ice cream in molds, the combination of a conveyor for the molds, a conveyor to receive frozen cream cakes ejected from the molds, a flame heater to direct a flame on the bottom of each moving mold, an air pressure blower to blow the cake out of the moving mold, and channel forming members supported on the cake conveyor beneath the blower to receive and position the cakes on said conveyor.

6. In a machine for use in making frozen confections, the combination of a conveyor for confection molds, a confection enrober, a conveyor for receiving frozen confection cakes ejected from the molds and for delivering the same to the enrober, means for ejecting the frozen cakes from the molds, and means supported by the moving receiving conveyor and located substantially directly beneath the ejector means for receiving the ejected cakes positioning them on the receiving conveyor, and offsetting any tendency for the cakes to run or slip into contact with each other, whereby the cakes are positioned on said receiving conveyor for delivery in spaced relationship to the enrober.

7. In a machine for use in making frozen confections in molds, means for ejecting the frozen confection cakes from moving molds comprising, in combination, a series of molds and means for moving the same, heating means for heating the bottom of each moving mold to loosen the cake therein, and an air pressure blower operable on the moving molds to blow the cakes out of the molds.

ROBERT T. COBB.